United States Patent
Kodama

(10) Patent No.: US 7,652,807 B2
(45) Date of Patent: Jan. 26, 2010

(54) IMAGE GENERATING APPARATUS, IMAGE GENERATING METHOD AND COMPUTER READABLE MEDIUM

(75) Inventor: Mari Kodama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 288 days.

(21) Appl. No.: 11/976,287

(22) Filed: Oct. 23, 2007

(65) Prior Publication Data

US 2008/0186519 A1 Aug. 7, 2008

(30) Foreign Application Priority Data

Feb. 6, 2007 (JP) ............................. 2007-026438

(51) Int. Cl.
G03F 3/08 (2006.01)
G06F 3/12 (2006.01)
G06K 15/00 (2006.01)
H04N 1/409 (2006.01)
G06K 9/34 (2006.01)

(52) U.S. Cl. .................. 358/518; 358/2.1; 358/1.9; 358/3.26; 358/3.27; 358/3.24; 358/2.99; 382/162; 382/167; 382/173; 382/174; 382/178; 382/258

(58) Field of Classification Search ................ 358/518, 358/1.9, 2.1, 3.26, 3.27, 2.99, 3.24; 382/162, 382/167, 173, 174, 178, 258
See application file for complete search history.

(56) References Cited

U.S. PATENT DOCUMENTS 6,067,097 A * 5/2000 Morita et al. ............... 345/505
6,504,955 B2 * 1/2003 Oomura et al. ............. 382/173
7,274,818 B2 * 9/2007 Suzuki ....................... 382/167
7,359,089 B2 * 4/2008 Imai ............................ 358/1.9

FOREIGN PATENT DOCUMENTS

JP    A 2004-174964    6/2004

* cited by examiner

Primary Examiner—Edward L Coles
Assistant Examiner—Charlotte M Baker
(74) Attorney, Agent, or Firm—Oliff & Berridge PLC

(57) ABSTRACT

An image generating apparatus includes a color correcting unit, a setting unit and an image generating unit. The color correcting unit corrects a drawing color of each image element. When at least one of color components of the corrected drawing color of each image element meets a predetermined condition, the setting unit sets the at least one of the color components to a predetermined value. The image generating unit draws each image element with the drawing color subjected to the correcting and the setting, to generate an image. When the image element, which is to be drawn with the drawing color including the at least one of the color components, is drawn to overlap another image element, the image generating unit draws a color component, which is same as the at least one of the color components, of a drawing color of the other image element without overwriting.

18 Claims, 5 Drawing Sheets

IMAGE GENERATING APPARATUS, IMAGE GENERATING METHOD AND COMPUTER READABLE MEDIUM

CROSS-REFERENCE TO RELATED APPLICATIONS

This application is based on and claims priority under 35 U.S.C. §119 from Japanese Patent Application No. 2007-26438 filed on Feb. 6, 2007.

BACKGROUND

1. Technical Field

The invention relates to an image generating apparatus, an image generating method, an image generating program, a computer readable medium storing the image generating program and a computer data signal embedded with the image generating program.

2. Related Art

Prior to printing a document requested by a customer, there is a case where a comprehensive layout is provided to the customer as a sketch showing an outline of a design. In many cases, such a comprehensive layout is output with a color printer rather than a printing machine that actually prints the document.

However, whereas the printing machine can provide a semi-transparent effect by overlapping inks, if objects to be drawn are overlapped in an output process of the color printer, a color of an object on a background color is replaced with a color having a higher overlapping priority (a color to be drawn on a more foreground side), and an effect by overlapping inks cannot be achieved in many cases.

That is, consider two colored disks as conceptually shown in FIG. 5. It is assumed that a first disk A is drawn on a more background side and that a color of the first disk A is set to cyan (C): 100%, magenta (M): 0%, yellow (Y): 10%, black (K): 0%. Also, it is assumed that a second disk B is drawn on a more foreground side with partially overlapping the first disk A and that a color of the second disk B is set to cyan (C): 0%, magenta (M): 0%, yellow (Y): 100%, black (K): 10%. In this case, a color in a portion where the first disk A and the second disk B overlap becomes the color of the second disk B drawn on the more foreground side (C: 0%, M: 0%, Y: 100%, K: 10%) and the colors of cyan (C) and magenta (M) on the background side are not reflected (so called "knockout").

Hence, a process of not replacing a color of an object on a background side with a color, of a plate, set to 0% when colors are divided into respective plate ("nonZero Overprint" in, for example, the postscript (registered trademark)) has been proposed. According to this process, in the above-described case, as shown in FIG. 6, in the portion where the first disk A and the second disk B overlap, a color component of the second disk B drawn on the more foreground side having a value of 0% is set to a value of the color component of the first disk A on the more background side. That is, the color of that portion is set to C: 100%, M: 0%, Y: 100%, K: 10%, and the colors of cyan (C) and magenta (M) on the background side are reflected. Thus, an effect by overlapping inks can be achieved virtually.

That is, in the nonzero overprint, if there is an object in which, for example, although colors are put on plates of yellow and black, colors are not put on plates of cyan and magenta (that is, the plates of cyan and magenta are designated to have 0%) in forming of a bitmap image, the color of the background is not masked by the plates of cyan and magenta set to 0%.

SUMMARY

According to an aspect of the invention, an image generating apparatus includes a receiving unit, a color correcting unit, a setting unit and an image generating unit. The receiving unit receives description information in which a plurality of image elements which are drawing objects is described. The color correcting unit corrects a drawing color of each image element based on a predetermined rule with reference to the received description information. When at least one of color components of the corrected drawing color of each image element meets a predetermined condition, the setting unit sets the at least one of the color components of the drawing color meeting the predetermined condition to a predetermined value. The image generating unit draws each image element with the drawing color subjected to the correcting and the setting, to generate an image formed of pixels. When the image element, which is to be drawn with the drawing color including the at least one of the color components set to the predetermined value, is drawn to overlap another image element, the image generating unit draws a color component, which is same as the at least one of the color components set to the predetermined value, of a drawing color of the other image element without overwriting the color component of the drawing color of the other color component.

BRIEF DESCRIPTION OF THE DRAWINGS

Exemplary embodiments of the invention will be described in detail below with reference to the accompanying drawings, wherein.

DETAILED DESCRIPTION

Figure 1:
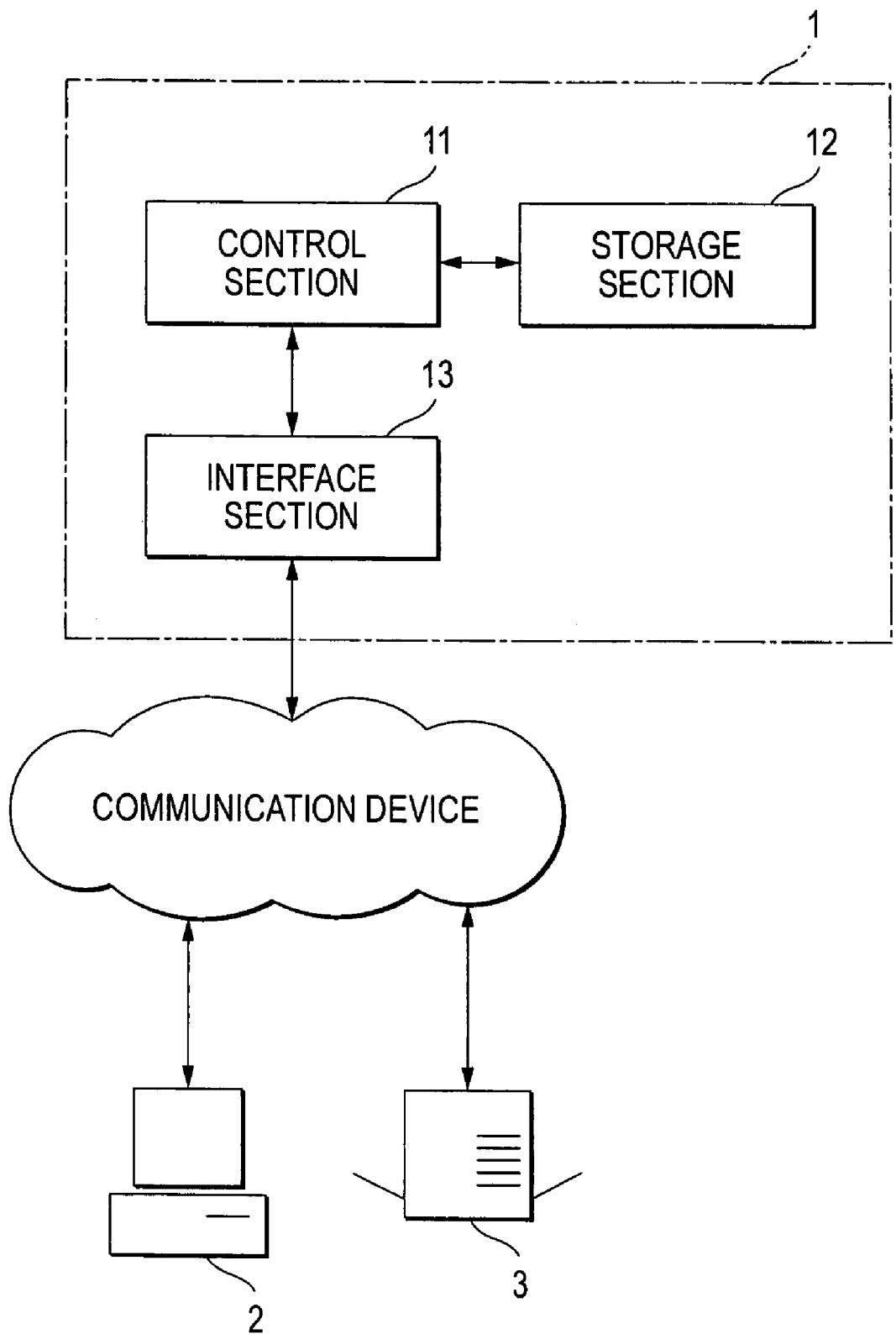
FIG. 1 is a block diagram showing the configuration of an image generating apparatus according to an exemplary embodiment of the invention and a connection example of its components.

An exemplary embodiment of the invention will be explained in reference to the drawings. An image generating apparatus 1 according to the exemplary embodiment of the invention is connected to a client apparatus 2 and a printer apparatus 3 as shown in FIG. 1. As shown in FIG. 1, the image generating apparatus 1 includes a control section 11, a storage section 12, and an interface section 13.

Here, the control section 11 is a program control device such as CPU and operates in accordance with a program stored in the storage section 12. In this exemplary embodiment, the control section 11 carries out a process of generating bitmap image data, with which the printer apparatus 3 can perform an image formation process, based on description information in which an image element (object) of a drawing object is described, such as the postscript (registered trademark) interpreter.

Further, in this process, when overlapped image elements are drawn as in the nonzero overprint in the postscript (registered trademark), if at least one color component of a drawing color of the image element in the foreground has a predetermined value, a process of not masking a value of a corresponding color component of the image element in the background (quasi overprint process) is carried out.

Further, it is assumed that in generating the bitmap image data, the control section 11 carries out a color correction process for a drawing color of an object described in the description information. The color correction may include a color matching process based on a color reproduction characteristic of the printer apparatus 3.

Furthermore, in the process of generating the bitmap image data, when one color component of the corrected drawing color of each image element meets a predetermined condition, the control section 11 sets the one color component of the corrected drawing color to the predetermined value used in the quasi overprint process. In the case of the nonzero overprint, this predetermined value is a value expressing "0%." Details of a specific process carried out by the control section 11 will be described later.

The storage section 12 includes a storing element such as RAM (Random Access Memory) or a storage device such as a hard disk. The storage section 12 stores a program executed by the control section 11. The program may be provided with being stored in a computer readable record medium such as CD-ROM or DVD-ROM, and then copied into the storage section 12.

Furthermore, the storage section 12 may also operate as a working memory of the control section 11, and holds, for example, information stored by the control section 11, the bitmap image data or the like.

The interface section 13 is a communication device, such as a network interface and/or a serial interface (USB), for transmitting and receiving information to and from the client apparatus 2 and the printer apparatus 3. In the exemplary embodiment, the interface section 13 receives the description information in which an object to be drawn is described from the client apparatus 2 and outputs it to the control section 11. Here, the description information is information described in, for example, the postscript (registered trademark).

Also, the interface section 13 transmits the bitmap image data generated by the control section 11 to the printer apparatus 3 in accordance with a command input from the control section 11.

Next, description will be given on details of the process carried out by the control section 11. The following process of the control section 11 is executed when, for example, a command for carrying out the process is received from a user.

When the control section 11 receives input of the description information from the interface section 13, the control section 11 stores the description information in the storage section 12. Then, upon receipt of an image formation command from the user, the control section 11 starts a process shown in FIG. 2. Here, it is assumed that the image formation command from the user includes (i) information specifying the description information which is an image formation target and (ii) designation as to whether or not the quasi overprint process is to be executed.

The control section 11 reads one piece of information of objects for which a drawing process has not yet been performed, from the description information which is the image formation target (S1). Hereinafter, this read-out object is referred to as an object in question. Further, the control section 11 checks as to whether or not a setting is made in the image formation command such that that the quasi overprint process is to be executed (S2).

When the control section 11 confirms at the process S2 that the setting is made such that the quasi overprint process is to be executed, the control section 11 determines as to whether or not the object in question is an object for which the overprint process is specified and which is other than an image (S3).

When the control section 11 determines that the object in question is an object for which the quasi overprint is to be performed, the control section 11 acquires a color value of each plate of a drawing color of the object in question and stores in the storage section 12 (S4). Then, the control section 11 executes a predetermined color correction process for the drawing color of the object in question (S5).

Furthermore, the control section 11 checks as to whether or not the setting is made in the image formation command such that the quasi overprint process is to be executed (S6). When the setting is made such that the quasi overprint process is to be executed, the control section 11 selects a color value that meets a predetermined condition (described later in detail) from among color values of the respective plates of the drawing color after subjected to the color correction process and re-sets the selected color value to a predetermined value (in this exemplary embodiment, 0%). That is, for example, when the control section 11 confirms at the process S6 that the setting is made such that the quasi overprint process is to be executed, the control section 11 reads color values of the respective plates of the drawing color of the object in question (a color value before subjected to the color correction) stored in the storage section 12 and specifies a plate having a color value expressing "0%" from the read color values (S7). Then, the control section 11 sets the color value of the plate specified at the process S7 to that expressing "0%," among the respective plates of the drawing color which have been subjected to the color correction process and which had the color values expressing "0%" before the color correction process (S8).

Then, the control section 11 generates a bitmap image (an image formed of pixels) based on the description information of the object in question (S9). The control section 11 checks as to whether or not an object which has not yet been selected as an object in question is included in the description information which the image formation target (S10). Here, when an object which has not yet been selected as an object in question (that is, an object for which the drawing process has not yet been performed) is included in the description information which is the image formation target, the control section 11 returns to the process S1 and continue the processes.

Further, when the control section 11 determines at the process S2 that the setting is not made such that the quasi overprint process is to be executed or when the control section 11 determines at the process S3 that an object in question is not an object for which the quasi overprint process can be performed, the control section 11 proceeds to the process S5 to execute the color correction process. Also, when the control section 11 determines at the process S6 that the setting is not made such that the quasi overprint process is to be executed, the control section 11 proceeds to the process S9 and continues the process.

When there is no color value, before the color correction, of the respective plates of the drawing color of the object in question that express "0%" at the process S7 or when the drawing color before the color correction is not stored, the control section 11 does not make the setting at the process S8 but proceeds to the process S9.

Furthermore, when an object which has not yet been selected as object in question (that is, an object for which the drawing process has not yet been performed) is not included in the description information which is the image formation target at the process S10, the process is finished. Then, data of the bitmap image generated by this process is transmitted to the printer apparatus 3 or the like and an image formation process will be performed based on the transmitted data.

Figure 5:
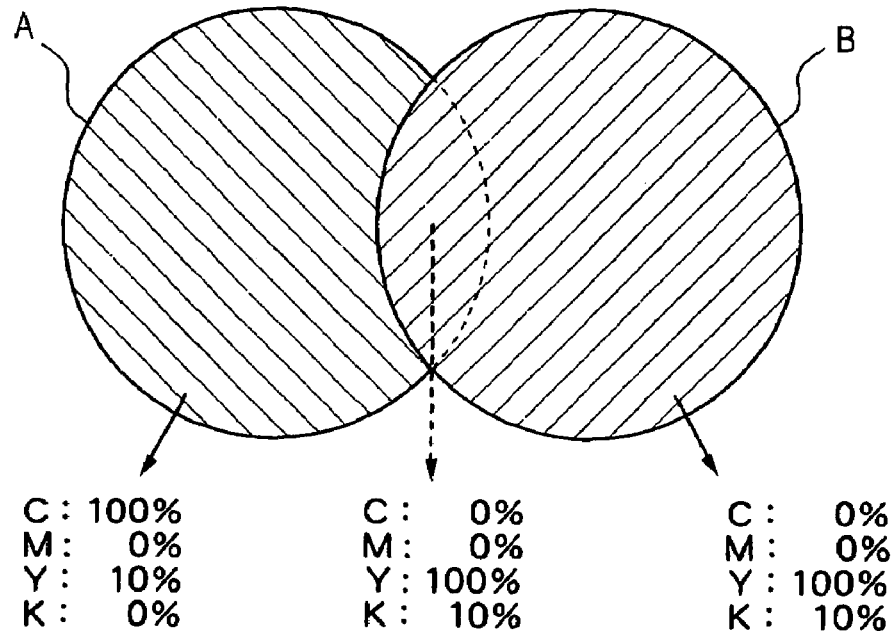
FIG. 5 is an explanatory view showing a drawing example of overlapped images.
Figure 6:
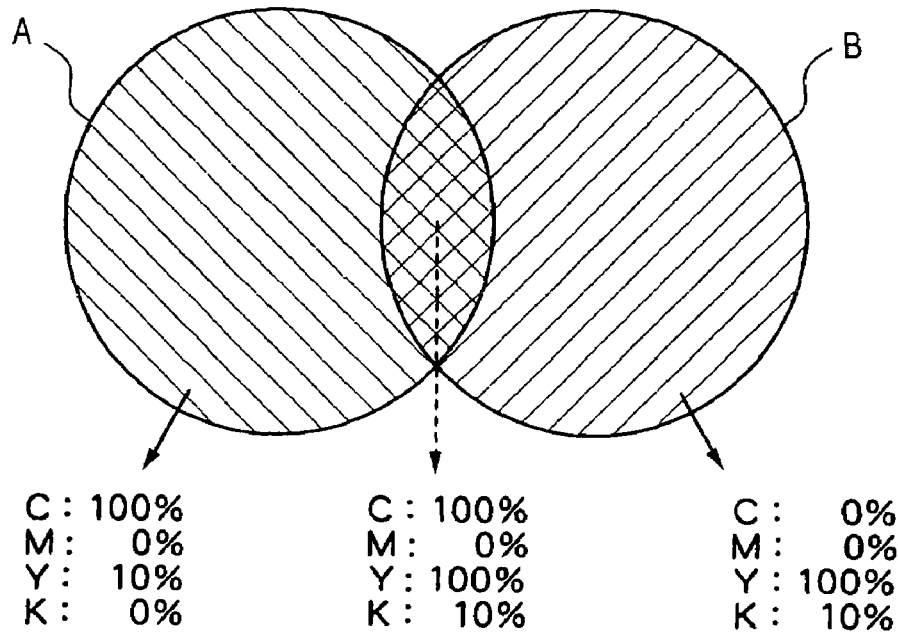
FIG. 6 is an explanatory view showing an example of overlapped images drawn by the overprinting.

According to the exemplary embodiment, the image generating apparatus 1 operates as follows. Here, described will be the case where two disks which overlap each other and which are filled are drawn as exemplified in FIG. 3. The disks are the same as those shown in FIG. 5. In this case, the image generating apparatus 1 stores cyan (C): 0%, magenta (M): 0%, yellow (Y): 100%, black (K): 10% which are color components of the second disk B on the foreground side (α). Then, the color correction process is performed for this color. It is assumed that as a result of the color correction process, for example, the resultant color includes cyan (C): 1%, magenta (M): 1%, yellow (Y): 99%, black (K): 10% (β).

Since the stored color values of the cyan (C) plate and magenta (M) plate (before color correction) are "0%," the image generating apparatus 1 again sets to 0% the color values of the corresponding plates among the color values after subjected to the color correction process (γ). That is, eventually, the image generating apparatus 1 sets the drawing color of the second disk B to cyan (C): 0%, magenta (M): 0%, yellow (Y): 99%, black (K): 10%, and provides the resultant drawing color to the drawing process (δ).

Thereby, the cyan (C) plate and the magenta (M) plate are again set to 0%, and no data is output to those plates. Therefore, when the nonzero overprint of the postscript (registered trademark) is performed, a color achieved by overlapping inks can be reproduced, and the colors of those plates (C, M) of the first disk A under those plates (C, M) of the second disk B are not knocked out.

Also, here, the predetermined condition which is used in determining as to whether a color value of at least one of the plates of the drawing color after subjected to the color correction is set to the predetermined value (for example, 0%) is a condition that a color value of any plate before subjected to the color correction is equal to the predetermined value. However, the predetermined condition is not limited thereto.

Figure 2:
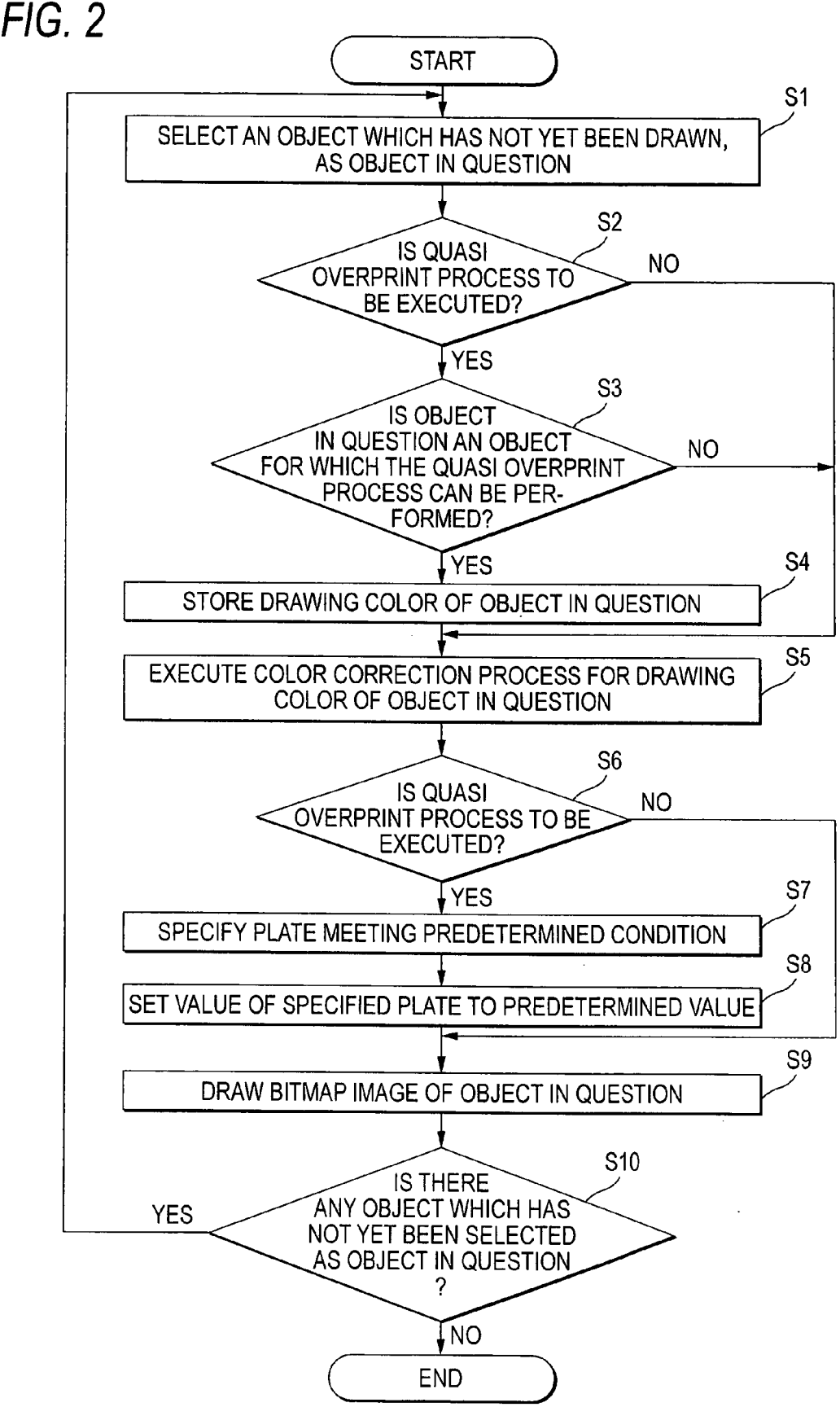
FIG. 2 is a flowchart showing an example of an operation of the image generating apparatus according to the exemplary embodiment of the invention.
Figure 4:
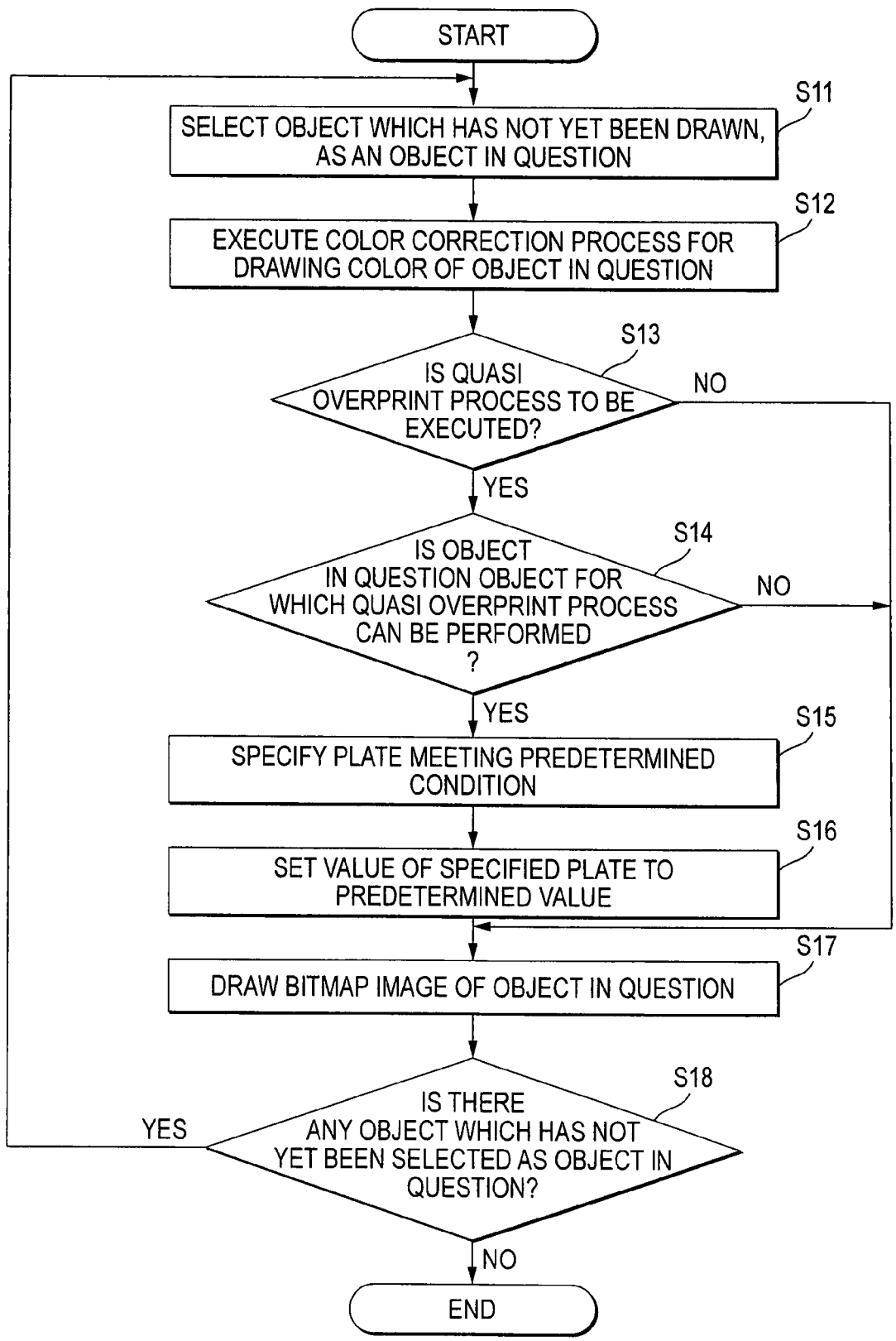
FIG. 4 is a flowchart showing another example of the operation of the image generating apparatus according to the exemplary embodiment of the invention.

For example, in place of the processes shown in FIG. 2, processes shown in FIG. 4 may be executed. That is, the control section 11 reads one piece of information of objects for which a drawing process has not yet been performed, from the description information which is the image formation target as an object in question (S11). Then, the control section 11 executes a predetermined color correction process for the drawing color of the object in question (S12).

Next, the control section 11 checks as to whether or not setting is made in an image formation command such that the quasi overprint process is to be executed (S13).

Here, when the setting is made such that that the quasi overprint process is to be executed, the control section 11 determines as to whether or not the object in question is an object for which the overprint process is specified and which is other than an image (S14).

The control section 11 selects a color value that meets the predetermined condition from among color values of the respective plates of the drawing color after subjected to the color correction process and re-sets the selected color value to a predetermined value (in this exemplary embodiment, 0%).

That is, for example, when the control section 11 determines at the process S14 that the object in question is an object for which the quasi overprint process can be performed, the control section 11 reads the color values of the respective plates of the drawing color of the object in question after subjected to the color correction and specifies an object which falls within a predetermined range from the predetermined value (here, for example, "0%") (S15).

In this exemplary embodiment, it is assumed that the predetermined value is equal to "0%." Therefore, at the process S15, the control section 11 specifies color values which are (i) equal to or smaller than X % or (ii) less than X % (for example, less than 3%) from among the color values of the respective plates after subjected to the color correction. Then, the control section 11 sets the color values of the plates specified in the process S15 to a value expressing "0%" among the respective plates of the drawing color after subjected to the color correction process (S16).

Then, the control section 11 generates a bitmap image (an image formed of pixels) based on the description information of the object in question (S17). The control section 11 checks as to whether or not an object which has not yet been selected as an object in question is included in the description information which is the image formation target (S18). Here, when an object which has not yet been selected as an object in question (that is, an object for which the drawing process has not yet been performed) is included in the description information which is the image formation target, the control section 11 returns to the process S11 and continue the processes.

Also, when the control determines at the process S13 that the setting is made such that the quasi overprint process is to be executed or when the control section determines at the process S14 that the objection in question is not an object for which the quasi overprint process cannot be performed, the control section 11 proceeds to the process S17.

Also, at the process S15, when no color value, before subjected to the color correction, of the respective plates of the drawing color of the object in question meets the predetermined condition, the control section 11 proceeds to the process S17 without carrying out the setting at the process S16.

Furthermore, at the process S18, when an object which has not yet been selected as an object in question yet (that is, an object for which the drawing processing has not yet been performed) is not included in the description information which is the image formation target, the process is finished. Then, data of the bitmap image generated by this process is transmitted to the printer apparatus 3 or the like and an image formation process will be performed based on the transmitted data.

Figure 3:
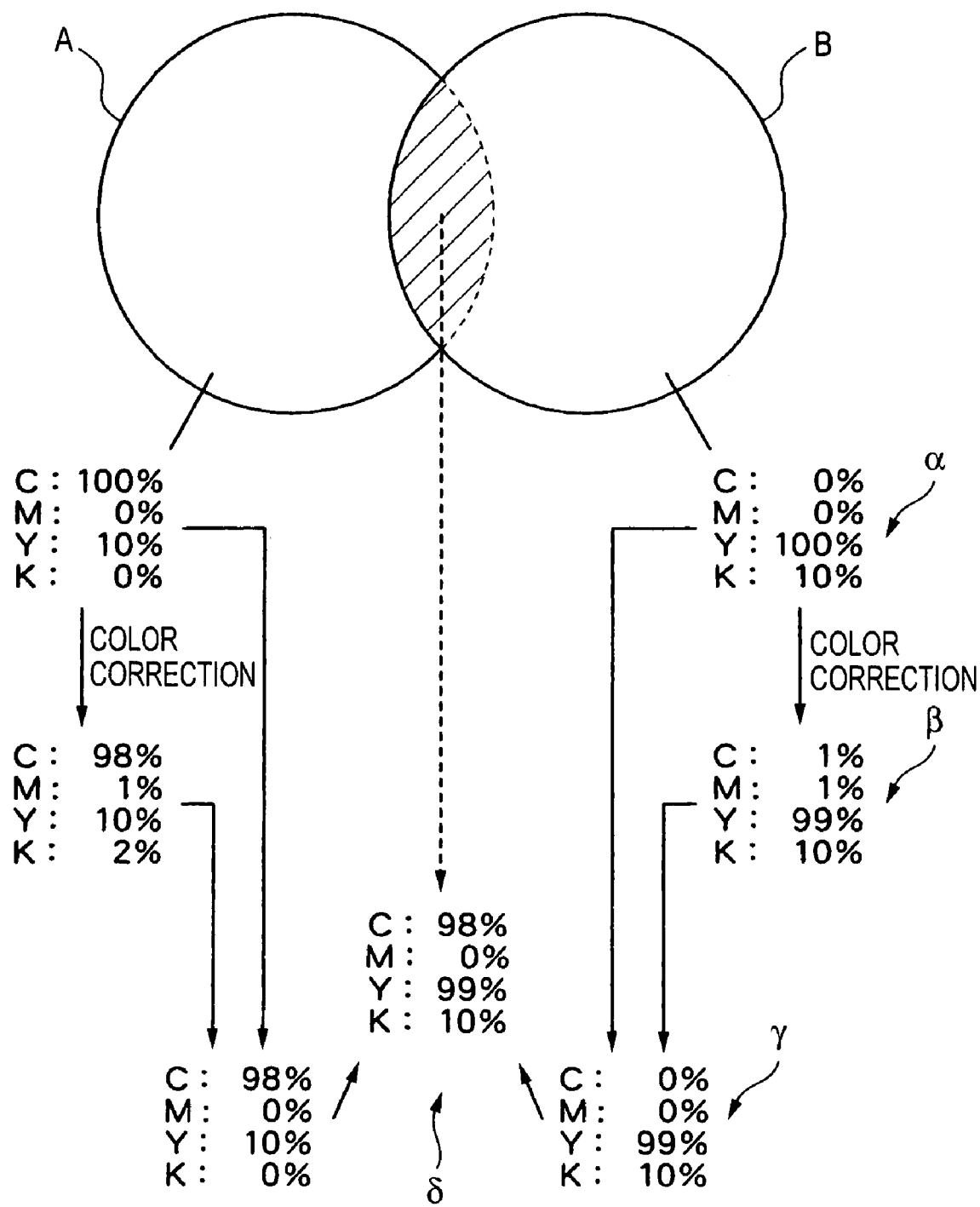
FIG. 3 is an explanatory view showing an example of the operation of the image generating apparatus according to the exemplary embodiment of the invention.

Also, according to this example, in an example of FIG. 3, a color of the second disk B which has been subjected to the color correction and which has cyan (C): 1%, magenta (M): 1%, yellow (Y): 99%, black (K): 10% is set to cyan (C): 0%, magenta (M): 0%, yellow (Y): 99%, black (K): 10%.

In this way, according to the exemplary embodiment, in a procedure of generating a bitmap image without adjusting color values for each pixel (rasterizing procedure), a process for an effect of color reproduction by overlapping (a process for achieving overprint effect) can be performed, and the effect by overlapping inks can be achieved while reducing the process load.

What is claimed is:

1. An image generating apparatus comprising:
   a receiving unit that receives description information in which a plurality of image elements which are drawing objects is described;

a color correcting unit that corrects a drawing color of each image element based on a predetermined rule with reference to the received description information;

a setting unit, wherein when at least one of color components of the corrected drawing color of each image element meets a predetermined condition, the setting unit sets the at least one of the color components of the drawing color meeting the predetermined condition to a predetermined value; and an image generating unit that draws each image element with the drawing color subjected to the correcting and the setting, to generate an image formed of pixels, wherein:

when the image element, which is to be drawn with the drawing color including the at least one of the color components set to the predetermined value, is drawn to overlap another image element, the image generating unit draws a color component, which is same as the at least one of the color components set to the predetermined value, of a drawing color of the other image element without overwriting the color component of the drawing color of the other color component.

2. The apparatus according to claim 1, further comprising:
a recording unit for records the drawing color, before subjected to the correcting, of each image element with reference to the received description information, wherein:
the predetermined condition includes a condition that a value of any color component of the drawing color, recorded by the recording unit, of each image element is equal to the predetermined value.

3. The apparatus according to claim 1, wherein the predetermined condition includes a condition that a value of any color component of the corrected drawing color of each image element falls within a predetermined range from the predetermined value.

4. The apparatus according to claim 1, wherein the predetermined value is a value expressing 0%.

5. The apparatus according to claim 2, wherein the predetermined value is a value expressing 0%.

6. The apparatus according to claim 3, wherein the predetermined value is a value expressing 0%.

7. An image generating method comprising:
receiving description information in which a plurality of image elements which are drawing objects is described;
correcting a drawing color of each image element based on a predetermined rule with reference to the received description information;
when at least one of color components of the corrected drawing color of each image element meets a predetermined condition, setting the at least one of the color components of the drawing color meeting the predetermined condition to a predetermined value; and
drawing each image element with the drawing color subjected to the correcting and the setting, to generate an image formed of pixels, wherein:
when the image element, which is to be drawn with the drawing color including the at least one of the color components set to the predetermined value, is drawn to overlap another image element, the drawing comprises drawing a color component, which is same as the at least one of the color components set to the predetermined value, of a drawing color of the other image element without overwriting the color component of the drawing color of the other color component.

8. The method according to claim 7, further comprising:
recording the drawing color, before subjected to the correcting, of each image element with reference to the received description information, wherein:
the predetermined condition includes a condition that a value of any color component of the recorded drawing color of each image element is equal to the predetermined value.

9. The method according to claim 7, wherein the predetermined condition includes a condition that a value of any color component of the corrected drawing color of each image element falls within a predetermined range from the predetermined value.

10. The method according to claim 7, wherein the predetermined value is a value expressing 0%.

11. The method according to claim 8, wherein the predetermined value is a value expressing 0%.

12. The method according to claim 9, wherein the predetermined value is a value expressing 0%.

13. A computer readable medium storing a program causing a computer to execute a process for generating an image, the process comprising:
receiving description information in which a plurality of image elements which are drawing objects is described;
correcting a drawing color of each image element based on a predetermined rule with reference to the received description information;
when at least one of color components of the corrected drawing color of each image element meets a predetermined condition, setting the at least one of the color components of the drawing color meeting the predetermined condition to a predetermined value; and
drawing each image element with the drawing color subjected to the correcting and the setting, to generate an image formed of pixels, wherein:
when the image element, which is to be drawn with the drawing color including the at least one of the color components set to the predetermined value, is drawn to overlap another image element, the drawing comprises drawing a color component, which is same as the at least one of the color components set to the predetermined value, of a drawing color of the other image element without overwriting the color component of the drawing color of the other color component.

14. The medium according to claim 13, wherein the process further comprises:
recording the drawing color, before subjected to the correcting, of each image element with reference to the received description information, wherein:
the predetermined condition includes a condition that a value of any color component of the recorded drawing color of each image element is equal to the predetermined value.

15. The medium according to claim 13, wherein the predetermined condition includes a condition that a value of any color component of the corrected drawing color of each image element falls within a predetermined range from the predetermined value.

16. The medium according to claim 13, wherein the predetermined value is a value expressing 0%.

17. The medium according to claim 14, wherein the predetermined value is a value expressing 0%.

18. The medium according to claim 15, wherein the predetermined value is a value expressing 0%.

* * * * *